Aug. 16, 1960         G. H. TOWNEND ET AL         2,949,227
                         COUNTER DEVICES
Filed Oct. 7, 1953                              3 Sheets-Sheet 1

INVENTORS
Gordon Howard Townend
Walter Horton

BY Richardson, David, Morton
        Their ATTORNEYS

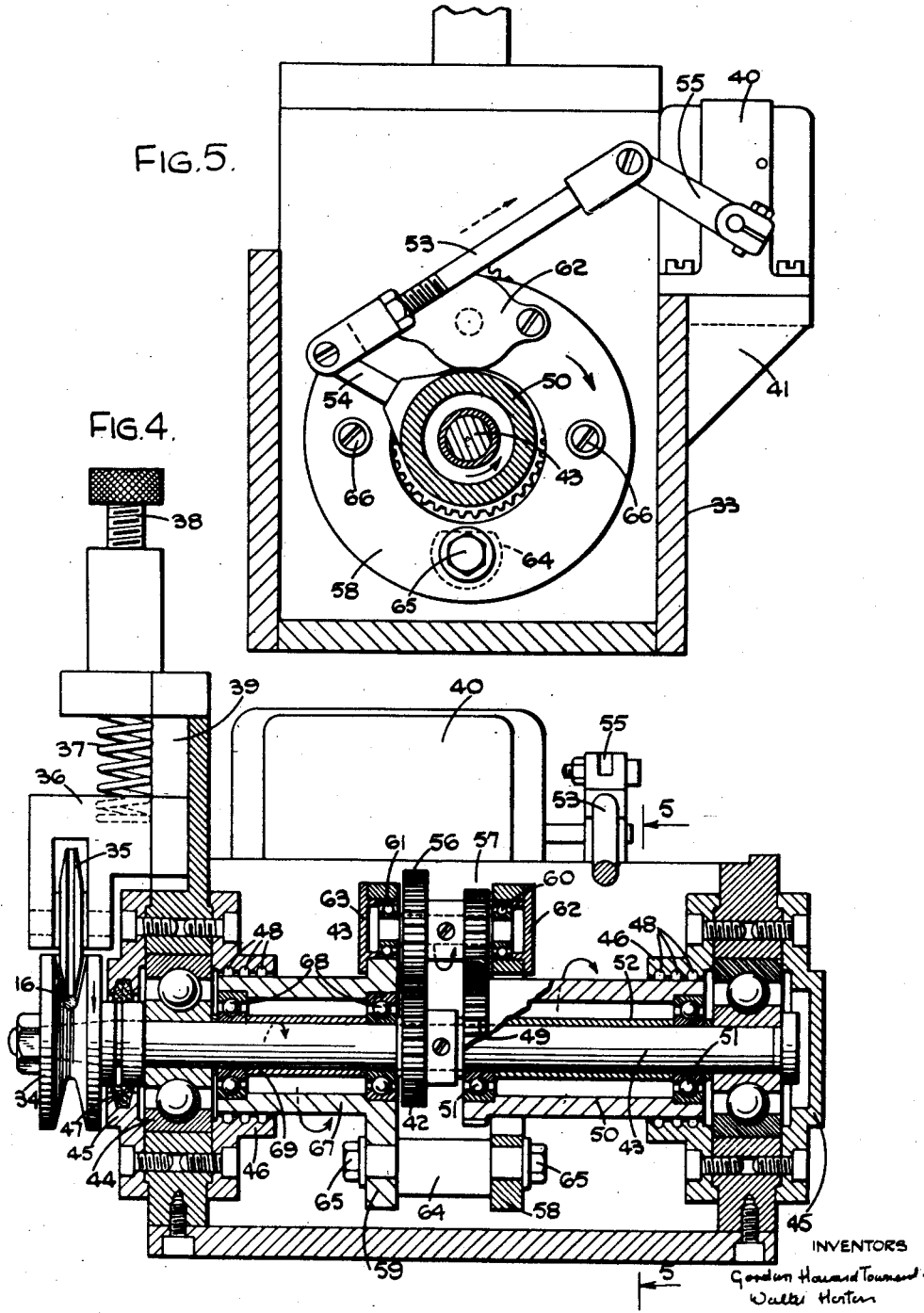

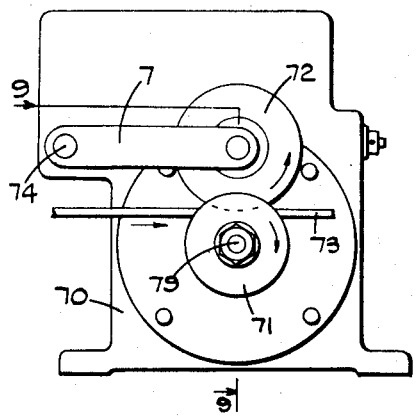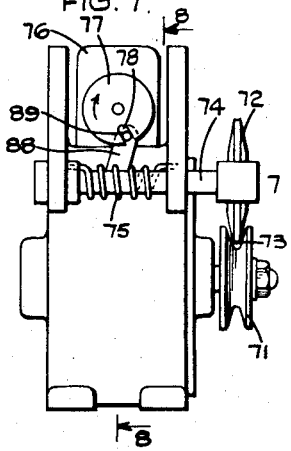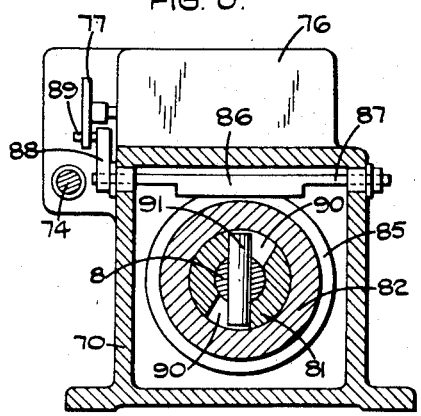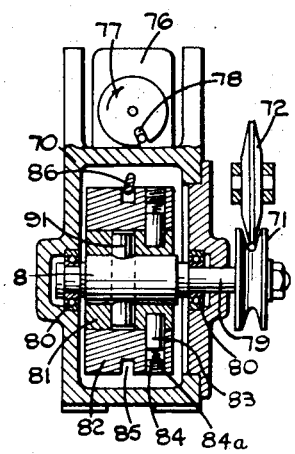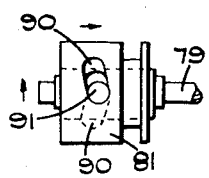

United States Patent Office 2,949,227
Patented Aug. 16, 1960

2,949,227
COUNTER DEVICES

Gordon Howard Townend, Bilbrook, and Walter Horton, Wolverhampton, England, assignors to G.K.N. Group Services Limited, Smethwick, England, a British company Filed Oct. 7, 1953, Ser. No. 384,566

Claims priority, application Great Britain Oct. 16, 1952

16 Claims. (Cl. 235—91)

The present invention relates to a counting device intended for use in conjunction with machines or apparatus to which stock or rod, bar, strip, or other elongated form, is fed in a series of intermittent longitudinal feed movements each corresponding to the formation of a product or completion of a particular operation on the stock in the machine or apparatus.

The device is especially although not exclusively intended to be used in conjunction with machines for forming bolts, screws, studs, or the like fastening elements from wire stock fed to the machine as above described.

Hitherto it has been the usual practice to use a counting device which in effect utilises the aggregate of the intermittent feed movements which the stock undergoes to indicate the number of such individual movements, and the accuracy of the indication is thus dependent upon accurate measurement of the mean value of each intermittent feed movement for the purpose of calibrating or designing the counting device, and also upon the consistency with which the machine or its associated feeding device continues to adhere to this measured value of individual feed movement.

One object of the present invention is to provide a new or improved construction of counting device in which the accuracy of the indication furnished as to the number of feed movements does not depend upon the magnitude of each individual movement.

A further object of the invention is to provide a counting device in which the accuracy of the count is not affected by the magnitude of the velocity of the stock feeding movement.

Yet another object of the invention is to provide a counting device in which the accuracy of the count is not affected by some degree of slip or lost motion between the stock and a member of the counting device which receives and partakes of stock movement.

Yet another object of the invention is to provide a counting device capable of application to a variety of stock counting duties involving different lengths of stock feed and different velocities of stock feed without modification or substantial modification. Yet another object of the invention is to provide a new or improved construction of stock feed counter which is simple and reliable in operation and can be put into use continuously for long periods of service without detriment to the accuracy of the count recorded thereon.

The invention will now be described with reference to the embodiments shown by way of example in the accompanying drawings wherein:

Figure 4 is a view in front elevation and partly in cross section of an alternative construction of stock feed counter in accordance with the present invention utilizing a transformation device responsive to acceleration of the stock.

Figure 5 is a cross sectional view on line 5—5 of the same construction.

Figure 6 is a view in end elevation of yet another alternative construction of stock feed counter in accordance with the present invention utilizing a further formation device responsive to acceleration of the stock.

Figure 7 is a view of the same construction in rear elevation.

Figure 8 is a view of the same construction in cross section on the line 8—8 of Figure 7.

Figure 9 is a view of the same construction in cross section on the line 9—9 of Figure 6, and Figure 10 is a fragmentary plan view of the input and output element of the transformation device illustrating the manner in which limited axial displacement of these members relative to each other is attained in response to stock feed.

Figure 1:
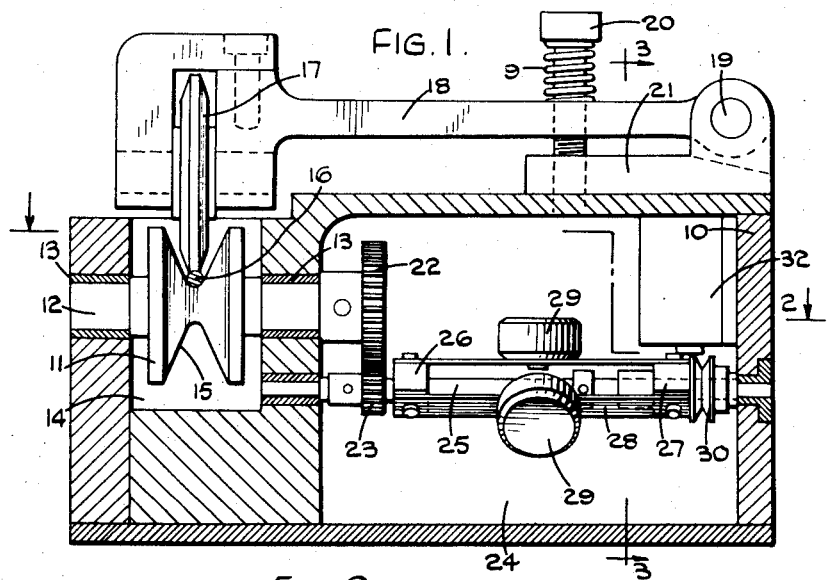
Figure 1 shows in front elevation and partly in cross section one construction of stock feed counter in accordance with the present invention utilizing a velocity responsive transformation device.
Figure 2:
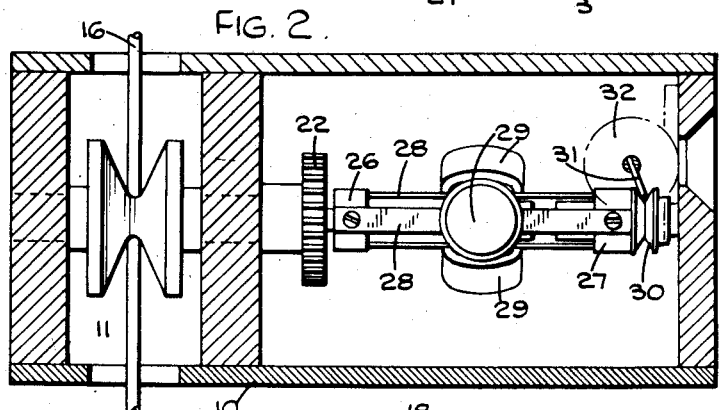
Figure 2 is a view of the same construction in cross section on the line 2—2 of Figure 1.
Figure 3:
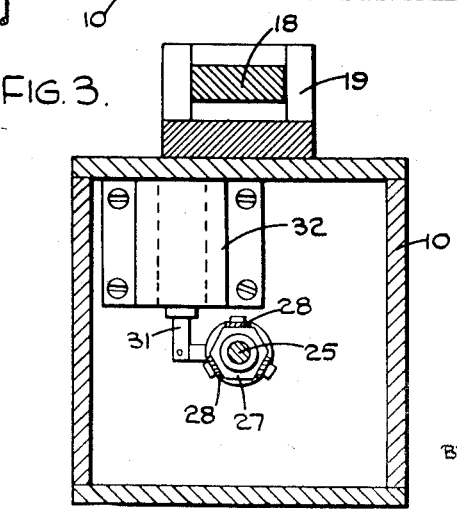
Figure 3 is a view of the same construction in cross section on the line 3—3 of Figure 1.

Referring firstly to the construction shown in Figures 1 to 3, the counter may have a body or casing 10 of any suitable form and mounted in this body in a stock engaging or input member comprising a peripherally grooved wheel or roller 11 supported on a shaft 12 mounted between axially spaced bearings 13 provided in the walls of a local housing 14 situated at one end of the body, the groove 15 in the periphery of the pulley may be of any convenient cross sectional shape, for example, of V-cross section and the stock indicated at 16 will then normally lie in the base of this groove.

The stock may be pressed into engagement with the input member by a pressure wheel or roller 17 journalled at one end of an arm 18 pivoted at 19 to the opposite end of a body and pressed downwardly by a coiled compression spring 9 disposed beneath the head of a pressure adjusting screw 20 entering a tapped hole in a block 21 formed as an integral part of the attachment fitting by which the arm is mounted on the body.

Within the casting proper the shaft 12 is provided with a gear 22 which meshes with a small gear or pinion 23 constituting the input element of a transformation device responsive to changes in velocity indicated generally at 24.

The gear ratio existing between the gears 22 and 23 may be such as to amplify the rotary displacement imparted to the shaft 12 by the stock sufficiently to enable the minimum stock feed to be counted to actuate the device 24.

The latter may comprise a governor mechanism having a spindle 25 on which are mounted a pair of axially spaced collars 26 and 27, the latter of which constitutes the tube element of the device and is slidable axially along the spindle, these collars are connected with each other by a plurality of longitudinally extending arms which may be in the form of resilient metal strips 28, for example, three in number, spaced apart at equal angular intervals and carrying at or near their centrepoint bobs or weights 29.

The collar 26 is pinned or otherwise fixed to the spindle 25 which in turn is driven by the pinion 23 and rotation thereof causes the bobs or weights to move outwardly and so draw the collar 27 along the spindle and to the left as viewed in Figures 1 and 2. Displacement of the collar 27 along the spindle is limited by a collar fixed on the spindle intermediate the collars 26 and 27 as clearly seen in Figures 1 and 2.

Fixed to or integral with the collar 27 is a grooved pulley 30 in the groove of which is disposed a rocker arm 31 forming the actuating member of a counting register 32.

When the collar 27 and pulley 30 are displaced axially this actuating member is oscillated to cause a count of one to be indicated on the counting register and subsequently when the motion of the stock ceases or slows down return movement of the collar 27 and pulley 30 under the influence of the restoring force provided by the strip metal arms 28 moves the actuating member back to its initial position.

Referring now to the constructions illustrated in Figures 4 and 5, the counter therein shown may have a body or casing 33 of any convenient form and at one end of this body is provided a rotary stock engaging or input member 34 in the form of a grooved pulley as hereinbefore described in connection with the construction shown in Figures 1 to 3 and in association with this is a pressure wheel or roller 35 which in this construction is mounted on a slide 36 pressed downwardly by a coiled compression spring 38 the pressure of which is adjustable by a screw 38 the body being formed with a slidable slideway 39 in which the slide 36 operates.

In this construction, the input member 34 is operatively connected to a counting register 40 mounted on an external bracket 41 on the body through the intermediary of a transformation device in the form of an epicyclic gear.

The input or primary element of the epicyclic gear is in the form of a toothed gear 42 fixed on a shaft 43 which carries and is driven by the input member 34, this shaft preferably being supported by an anti-friction bearing such as the ball bearing 44 where it passes through the wall of the body or casing. Suitable oil seals comprising cover plates 45 and 46 carrying a sealing washer 47 and having internal peripheral grooves 48 respectively may be provided.

The output element or tertiary element of the epicyclic gear comprises a toothed gear wheel 49 arranged coaxially with the gear wheel 42 forming the primary or input element and fixed to or formed integrally with a sleeve 50 concentric with the shaft 43 and freely rotatable about this by the provision of axially spaced ball bearings 51 between which is disposed a distance piece 52.

The epicyclic gear illustrated performs this function in two ways, firstly, the gear train constituted by the input or primary element 42 and output or tertiary element 49 with the intervening gears 56 and 57 provide a step-up velocity ratio which will magnify the rotary displacement imparted to the input member 34 by the smallest stock feed with which the counter is required to be used to a rotary displacement of the output element sufficient to move the lever arm 55 from its initial position as illustrated in Figure 5 to its displaced position which may be vertical or approximately so. Clearly the choice of gear ratios between the gears 42, 56, 57 and 49 may be varied widely and there may be cases where it is not necessary to provide any step-up ratio and there may be cases where it is necessary that this ratio should be a reduction ratio for example, where the stock feed counter is to be used in conjunction with large magnitude feeds.

The second way in which the transformation device converts or accommodates the input displacement to the requirements of the counting register is by movement of the secondary element of the differential gear which in the example illustrated is constituted by a cage or annulus which carries the gears 56 and 57.

This cage or annulus may be formed of a pair of axially spaced plates 58 and 59 having aligned openings supporting ball bearings 60 and 61 for stub spindles of the gear unit 56 and 57, these openings being fitted with suitable closure plates 62, 63. Opposite the gears 56, 57, the plates may engage with the ends of an intervening spacer 64 into which screw bolts 65 this spacer preferably being of sufficient weight to constitute a counter balance to the gear unit 56, 57. If desired, further spacers may be provided into which enter screws as indicated at 66, the whole of this assembly is supported by means of a sleeve member 67 which may be integral with the plate 59 and which is mounted concentrically with the shaft 43 upon intervening ball bearings 68 separated by a spacer 69.

When an input displacement is imparted to the input member 34 by movement of the stock in a direction to rotate the member 34 anti-clockwise as viewed from its outer or left hand face, the gear train 42, 56, and 57 transmits this motion in a like rotational sense to the output or tertiary element 49 with a step-up unitary or step-down ratio according to the diameters of the gears in the gear train and in consequence the lever arm 55 is moved from the position shown in Figure 5 upwardly towards its displaced position. This movement takes place because of the constraint imposed upon rotation of the secondary element comprising the cage or annulus supporting the gear unit 56, 57, principally because of the relatively high moment of inertia of this assembly in comparison with that afforded by the output element and associated linkage.

When the lever arm 55 reaches the upper limit of its displacement and is positively restrained against further movement any continued movement of the input member which may then obtain is absorbed by bodily rotation of the cage or annulus which by virtue of such rotation stores a quantity of energy.

When input displacement of the input member 34 ceases, or if the deceleration of this member is great enough, the stored energy continues to rotate the case or annulus and causes the output element 49 to be rotated in the reverse direction to that in which it was initially displaced thereby returning the lever arm 55 to its initial position.

It will thus be appreciated that this transformation device is responsive to acceleration and deceleration of the input member to provide limited displacement of the output element and storage of energy in the rotary cage or annulus. It is not essential that the mechanism should be in the form of an epicyclic gear since clearly other mechanisms having three independently rotatable geared elements, two of which form the input and output elements respectively and the third of which is subjected to yielding constraint, would produce an equivalent result. For example, a differential gear could be made to perform the same function by imposing an inertia or frictional constraint upon the rotary element thereof which is not utilised either as an input or output element.

Referring now to the construction illustrated in Figures 6 to 10 inclusive, the stock feed counter shown therein has a body or casing 70 at one end of which is provided a rotary stock engaging or input member 71 which may be in the form of a peripherally-grooved pulley as in the previous constructions and with which coacts a pressure wheel or roller 72 which in this construction is shown as supported at one end of a rocker arm 73, the spindle 74 of which carries a torsion spring 75 to produce the required downward pressure of the member 72 upon the stock indicated at 73.

A counting register 76 may be mounted externally, for example, on top of the body 70 as shown, and this counter is illustrated as having an actuating member in the form of a disc 77 having a peripheral notch or slot 78 for engagement by a peg of the output element of the transformation device hereinafter described.

In this construction, the transformation device comprises a lost motion mechanism which is responsive to velocity increases and decreases of the stock engaging member or input member 71. In the particular construction illustrated an input element 8 fixed on a shaft 79 which carries the input member 71 and is driven thereby, this shaft where it passes through or into openings in the body being supported by ball bearings 80.

The input element 8 may be in the form of a cylindrical boss or enlargement on the shaft 79 and carried concentrically thereon is a co-operative element of composite construction comprising an inner sleeve or ring 81 and an outer sleeve or ring 82 coupled frictionally to the inner sleeve or ring in any suitable manner, for example, by the provision of plungers 83 urged into a groove in the inner sleeve or ring by compression springs 84 retained at their outer ends by plugs or grub screws 84a in the outer sleeve or ring.

The outer sleeve or ring has a peripheral groove 85 in which engages a tongue 86 provided on the output element of the transformation device which is in the form of a spindle 87 journalled about an axis perpendicular to that of the input element in the upper part of the body or casing 70 and in tangential or approximately tangential relationship to the outer sleeve or ring 82, this output element externally of the body or housing is provided with a rocker arm 88 carrying the peg 89 previously mentioned for engagement in the slot or notch 78 of the counting register actuating member 77.

As in the construction described and illustrated in the previous figures, the counting register may require an input displacement confined within certain limits which may be interposed by stops provided on the counting register limiting rotation of its actuating member. To convert or accommodate variable extents of stock feed to the input requirements of this counting register, the co-operative element transformation device is arranged to be displaced through a limited axial movement relatively to the input element 78 upon initial rotation of the latter. This is effected by providing one of these elements with a helical or similarly inclined thrust face with which the outer elements co-operates and in the particular construction illustrated the inner sleeve or ring is provided for this purpose with a pair of inclined slots 90, the side edges of which afford the necessary inclined thrust faces and in these slots the input element 8 has disposed a transverse projection in the form of a pin 91. The slots may subtend at the centre of rotation an angle of about 30° and the helix angle or inclination, i.e. the angle between the thrust faces or side edges of the walls and the plane perpendicular to the axis of rotation may be approximately 13°, these figures being quoted by way of convenient example and not in any limiting sense.

When an input displacement involving acceleration is imparted to the input member 71 causing this, for example, to rotate in a clockwise direction as seen in Figure 6, the composite cooperative element comprising the inner and outer sleeves or rings 81 and 82 will, due to its own inertia, remain stationary until the pin 91 moves from the position shown in Figure 10 to the opposite ends of the associated slots 90 whereupon the composite element will be driven positively by the pin 91. The travel of the pin 91 along the slots 90 will however displace the composite co-operative element comprising the inner or outer sleeves or rings 81 or 82 as a whole to the right as viewed in Figures 9 and 10.

It will be evident that the axial displacement of the composite element comprising the inner and outer sleeves or rings 81 and 82 will be limited by stop means constituted by the ends of the slots 90 which come into engagement at the extremities of the permitted axial movement with the portions of the pin 91 disposed in these slots.

By virtue of engagement of the tongue 86 in the groove 85, clockwise rotation will be imparted to the output element 87 as viewed in Figure 7 thereby rotating the actuating member 77 to its limit of displacement in a clockwise direction as viewed in Figure 7.

When the actuating member 77 is positively restrained by the stop means against further rotation or by the prior engagement of the pin 91 with the ends of the slots 90 whichever first occurs, continued rotation of the input member 71 will then result only in rotation of the two sleeves or rings 81 and 82 without further axial displacement thereby absorbing but not transmitting the further motion of the input member and concurrently storing energy in the sleeves by virtue of their rotation.

On cessation or deceleration of the input member 71, the sleeve will, again due to its own inertia, tend to overrun the input element 80 and by doing so the pin 91 becomes displaced relatively back to its initial position as illustrated in Figure 10 thereby causing the sleeves to return axially to their former position and restoring the actuating member 77 to its initial position.

The frictional coupling between the outer ring or sleeve 82 and the inner ring or sleeve 81 effectively prevents any rebound in the event of very sudden stopping of the input member 71 since the outer sleeve or ring is enabled to continue rotating even after the sleeves as a whole have been restored to their initial axial position this continued rotation dissipating, the stored energy in the frictional coupling. In this construction and also in the construction illustrated in Figures 4 and 5, it would be possible instead of relying principally upon the moment of inertia of the two sleeves or of the cage or annulus to ensure the initial transmission of displacement to the counter actuating member to provide other restraining means such as a friction producing member or a light spring which latter would also constitute an energy storing means assisting return movement.

Counters of the construction as above described are believed to be capable of recording counts when the stock feed occurs in increments at a repetitive frequency from 50 to 1000 per minute but below this range a step-up velocity ratio may be required in the construction shown in Figures 6 and 10 if the acceleration of the feed is low. In the other constructions, the velocity ratio provided by the gears 22 and 23 and the gear train involved in the epicyclic mechanism will be designed to produce the necessary velocity or acceleration of the operative parts of the transformation device to ensure consistent and efficient working.

Further, all constructions are capable of dealing with substantial variations in the extent of stock feed, the figures of ½" and 5" having previously been mentioned merely by way of example and not in any limiting sense.

What we claim then is:

1. A stock feed counter comprising, a stock engaging member, means supporting same movably to allow a contact face on same to engage and partake of endwise feed movements imparted to elongated stock of continuous length sufficient to contain a plurality of such feed movements, a counting register having an actuating member movable according to a predetermined displacement cycle to produce unit increase in the count indicated on said register, and a transformation device operatively connecting the stock engaging member and the actuating member, said device including means responsive to acceleration imparted to the stock engaging member from the stock corresponding to a feed movement thereof, to furnish the required predetermined displacement cycle to the actuating member while the stock engaging member remains in contact with the stock.

2. A stock feed counter comprising, a stock engaging member, means supporting same movably to allow a contact face on same to engage and partake of endwise feed movements imparted to elongated stock of continuous length sufficient to contain a plurality of such feed movements, a counting register having an actuating member movable according to a predetermined displacement cycle to produce unit increase in the count indicated on said register and a transformation device having an input element operatively connected with the stock engaging member to be displaced thereby, an output element operatively connected with the actuating member, means limiting displacement of the output element in conformity with the predetermined displacement requirements of the actuating member for a unit increase in the count, and mechanism operatively interposed between the input and output elements and responsive to an acceleration imparted to the input element corresponding to a feed movement of the stock, to transmit only the required displacement to the output element irrespective of the magnitude of the displacement of the input element while the stock engaging member remains in contact with the stock.

3. A stock feed counter comprising, a stock engaging member, means supporting same for rotation about an axis, means for urging elongated stock to which endwise feed movements are imparted intermittently into engagement with a contact face on the stock engaging member, so that this latter is rotated intermittently and unidirectionally through angular displacements of magnitudes corresponding to the magnitudes of said feed movements, a counting register having an actuating member movable according to a predetermined displacement cycle to produce unit increase in the count indicated on said register, and a transformation device having an input element operatively connected with the stock engaging member to be displaced thereby, an output element operatively connected with the actuating member means limiting displacement of the output element in conformity with the predetermined displacement requirements of the actuating member for a unit increase in the count, and mechanism operatively interposed between the input and output elements and responsive to an acceleration imparted to the input element corresponding to a feed movement of the stock, to transmit only the required displacement to the output element irrespective of the magnitude of the displacement of the input element while the stock engaging member remains in contact with the stock.

4. A stock feed counter comprising, a stock engaging member, means supporting same for rotation about an axis, means for urging elongated stock to which endwise feed movements are imparted intermittently into engagement with a contact face on the stock engaging member, so that this latter is rotated intermittently and unidirectionally through angular displacements of magnitudes corresponding to the magnitudes of said feed movements, a counting register having an actuating member movable forwardly and reversely, stop means limiting said movement of the actuating member to that adapted to produce unit increase in the count indicated on said register, and a transformation device operatively connecting the stock engaging member and the actuating member, said device including means responsive in every displacement of the stock engaging member to an increase in velocity of the stock engaging member but adapted to be overridden by said stop means to move the actuating member forwardly and responsive to a decrease in velocity of the stock engaging member to move the actuating member reversely thereby enabling such forward and reverse movements to be executed in response to each feed movement of the stock while the stock engaging member remains in contact with and is controlled by the stock.

5. A stock feed counter comprising, a stock engaging member, means supporting same for rotation about an axis, means for urging elongated stock to which endwise feed movements are imparted intermittently into engagement with a contact face on the stock engaging member, so that this latter is rotated intermittently and unidirectionally through angular displacements of magnitudes corresponding to the magnitudes of said feed movements, a counting register having an actuating member movable forwardly and reversely, stop means limiting said movement of the actuating member to that adapted to produce unit increase in the count indicated on said register, and a transformation device operatively connecting the stock engaging member and the actuating member, said device including means responsive to increase in velocity of the stock engaging member but adapted to be overridden by said stop means to move the actuating member forwardly, and energy storage means associated operatively with said means responsive in every displacement of the stock engaging member corresponding to a feed movement of the stock to velocity increase so as to be charged during such increase and active during subsequent velocity decrease to effect said reverse movement of the actuating member while the stock engaging member remains in contact with and is controlled by the stock.

6. A stock feed counter comprising, a supporting structure, a rotary stock engaging member mounted on said structure, a pressure member cooperatively associated with the stock engaging member, means urging the pressure member towards a circular peripheral contact face on the stock engaging member, so that elongated stock to which endwise feed movements are imparted intermittently when engaged between the stock engaging member and the pressure member rotates the former intermittently and unidirectionally through angular displacements of magnitudes corresponding to the magnitudes of said feed movements, a counting register having an actuating member movable forwardly and reversely, stop means limiting said movement of the actuating member to that adapted to produce unit increase in the count indicated on said register, and a transformation device comprising a rotary assembly mounted on said structure and having an input element operatively connected with the stock engaging member to be accelerated and decelerated thereby, an output element operatively connected with the actuating member, and power storage means connected with said input element to be charged by increase in the speed of rotation of the assembly during every feed movement of the stock and connected operatively with the output element to cause same to be moved forwardly when undergoing such charging and to cause same to be moved reversely when delivering energy during decrease in the speed of rotation of the assembly during every feed movement of the stock.

7. A stock feed counter comprising, a supporting structure, a rotary stock engaging member mounted on said structure and having a circular peripheral contact face having a circumferential groove a pressure wheel movably mounted on said structure for rotation about an axis parallel to that of the stock engaging member intermittently and unidirectionally through angular displacements of magnitudes corresponding to the magnitudes of said feed movements, a counting register having an actuating member movable forwardly and reversely, stop means limiting said movement of the actuating member to that adapted to produce unit increase in the count indicated on said register, and a transformation device comprising a rotary assembly mounted on said structure and having an input element operatively connected with the stock engaging member and an output element operatively connected with the actuating member, said elements being rotatable collectively as part of said assembly and also movable relatively to each other, power storage means on said assembly charged by increase in the speed of rotation of the assembly during every feed movement of the stock and connected operatively with the output element to cause same to be moved forwardly when undergoing such charging and to cause same to be moved reversely relatively to the input element when delivering energy during decrease in the speed of rotation of the assembly during every feed movement of the stock.

8. A stock feed counter comprising, a stock engaging member, means supporting same movably to allow a contact face on same to engage and partake of endwise feed movements imparted to elongated stock of continuous length sufficient to contain a plurality of such feed movements, a counting register having an actuating member movable forwardly and reversely, stop means limiting said movement of the actuating member to that adapted to produce unit increase in the count indicated on said register, and a transformation device comprising a rotary assembly having an input element operatively connected with the stock engaging member to be displaced thereby, and an output element operatively connected with the actuating member and movable axially of the rotary assembly, and power storage means charged by increase in the speed of rotation of the assembly during every feed movement of the stock and connected operatively with the output element to cause same to be moved axially in a forward direction relatively to the rotary assembly when this latter is undergoing charging and to be moved axially reversely relatively to the rotary assembly when the power storage means is delivering energy during decrease in the speed of rotation of the assembly during every feed movement of the stock.

9. A stock feed counter comprising, a stock engaging member, means supporting same for rotation about an axis means for urging elongated stock to which endwise feed movements are imparted intermittently into engagement with a contact face on the stock engaging member, so that this latter is rotated intermittently and unidirectionally through angular displacements of magnitudes corresponding to the magnitudes of said feed movements, a counting register having an actuating member movable forwardly and reversely, stop means limiting said movement of the actuating member to that adapted to produce unit increase in the count indicated on said register, a device including means responsive to increase in velocity of the stock engaging member to move the actuating member forwardly upon every intermittent rotation of the stock engaging member corresponding to a feed movement of the stock, and spring means associated operatively with said means responsive to velocity increase so as to be stressed during such increase and active during subsequent velocity decrease to be relieved, and thereby to effect said reverse movement of the actuating member while the stock engaging member remains in contact with and is controlled by the stock.

10. A stock feed counter comprising, a stock engaging member, means supporting same movably to allow a contact face on same to engage and partake of endwise feed movements imparted to elongated stock of continuous length sufficient to contain a plurality of such feed movements, a counting register having an actuating member movable forwardly and reversely, stop means limiting said movement of the actuating member to that adapted to produce unit increase in the count indicated on said register, and a transformation device comprising a rotary assembly having an input element operatively connected with the stock engaging member to be displaced rotatably thereby an output element operatively connected with the actuating member and displaceable according to the predetermined displacement requirements thereof, and centrifugal mechanism having weight means rotatable about an axis and connected with said input element to be driven therefrom, said weight means being movable outwardly of said axis in response to increase in the speed of rotation of said assembly during every feed movement of the stock and movable inwardly of said axis in response to decrease in the speed of rotation of said assembly during every feed movement of the stock, said weight means being further connected with the output element to transmit only the required displacement to the output element irrespective of the magnitude of the displacement of the input element.

11. A stock feed counter comprising, a stock engaging member, means supporting same movably to allow a contact face on same to engage and partake of endwise feed movements imparted to elongated stock of continuous length sufficient to contain a plurality of such feed movements, a counting register having an actuating member movable forwardly and reversely, stop means limiting said movement of the actuating member to that adapted to produce unit increase in the count indicated on said register, and a transformation device comprising three rotatable gear elements geared epicyclically together, the first of said gear elements constituting an input element and being operatively connected with the stock engaging member to be rotated intermittently and unidirectionally thereby, the third of said gear elements constituting the output element and being operatively connected with the actuating member, and the second of said gear elements meshing with the first and third gear elements, said second gear element having greater inertia than that of said third gear element and actuating member in combination so that the output element is caused to move in a forward direction when speed of rotation of the input element is increasing during every feed movement of the stock, and is caused to move reversely when the speed of the input element is decreasing during every feed movement of the stock.

12. A stock feed counter comprising, a stock engaging member means supporting same movably to allow a contact face on same to engage and partake of endwise feed movements imparted to elongated stock of continuous length sufficient to contain a plurality of such feed movements, a counting register having an actuating member movable forwardly and reversely, stop means limiting said movement of the actuating member to that adapted to produce unit increase in the count indicated on said register, and a transformation device comprising a rotary assembly and including three rotatable gear elements whereof the first and third gear elements are arranged coaxially and constitute respectively input and output elements connected respectively with the stock engaging member and the actuating member and whereof the second gear element is planetarily arranged in mesh with the input and output gear elements, and is movable bodily planetarily around the axis of the input and output gear elements, inertia of said planetarily movable second gear element to movement in this manner being greater than the inertia of said third gear element and actuating member in combination so that the output element is caused to move in a forward direction when speed of rotation of the input element is increasing during every feed movement of the stock, and is caused to move reversely when the speed of the input element is decreasing during every feed movement of the stock.

13. A stock feed counter comprising, a stock engaging member, means supporting same movably to allow a contact face on same to engage and partake of endwise feed movements imparted to elongated stock of continuous length sufficient to contain a plurality of such feed movements, a counting register having an actuating member movable forwardly and reversely to produce unit increase in the count indicated on said register, and a transformation device comprising a rotary assembly having an input element operatively connected with the stock engaging member to be displaced rotatably thereby, and an output element operatively connected with the actuating member, said elements being rotatable collectively as part of said assembly and also movable relatively to each other in an axial direction, said elements having respective cooperative face parts of which one at least is inclined helically or similarly with respect to the axis of the rotary assembly to produce such relative axial displacement of the output element to move the actuating member in a forward direction when speed of rotation of the input element is increasing, and reversely in the opposite axial direction when the speed of the input element is decreasing.

14. A stock feed counter comprising, a stock engaging member, means supporting same movably to allow a contact face on same to engage and partake of endwise feed movements imparted to elongated stock of continuous length sufficient to contain a plurality of such feed movements, a counting register having an actuating member comprising a rotary assembly having an input element operatively connected with the stock engaging member to be displaced rotatably thereby and an output element operatively connected with the actuating member, said elements being rotatable collectively as part of said assembly and also movable relatively to each other in an axial direction one of said elements having at least one helically or similarly inclined guide and the other of said elements having a follower cooperating with said slide, to produce limited axial displacement of the output element to move the actuating member in a forward direction relatively to the input element when speed of rotation of the input element is increasing, and reversely in the opposite axial direction when the speed of the input element is decreasing.

15. A stock feed counter comprising, a stock engaging member, means supporting same movably to allow a contact face on same to engage and partake of endwise feed movements imparted to elongated stock of continuous length sufficient to contain a plurality of such feed movements, a counting register having an actuating member movable forwardly and reversely to produce unit increase in the count indicated on said register, and a transformation device comprising a rotary assembly having an input element operatively connected with the stock engaging member to be displaced rotatably thereby, and an output element operatively connected with the actuating member, said elements being rotatable collectively as part of said assembly and also movable relatively to each other in an axial direction, said elements having respective cooperative face parts of which one at least is inclined helically or similarly with respect to the axis of the rotary assembly to produce such relative axial displacement of the output element to move the actuating member in a forward direction when speed of rotation of the input element is increasing, and reversely in the opposite axial direction when the speed of the input element is decreasing, the rotary assembly further including a rotary component coupled frictionally to the output element so that upon stopping of the latter by the input element at the termination of each stock feed movement said rotary component over-runs to absorb any rebound of the actuating member of the counting register.

16. A stock feed counter comprising, a supporting structure, a pressure member cooperatively associated with the stock engaging member, means urging the pressure member towards a circular peripheral contact face on the stock engaging member so that elongated stock to which endwise feed movements are imparted intermittently when engaged between the stock engaging member and the pressure member rotates the former intermittently and unidirectionally through angular displacements of magnitudes corresponding to the magnitudes of said feed movements, a counting register having an actuating member movable forwardly and reversely to produce unit increase in the count indicated on said register, and a transformation device comprising a rotary input element driven intermittently and unidirectionally from the stock engaging member and mounted on said structure, such element having a radial projecting part, an inner rotatable sleeve mounted on said input element having a helically or similarly inclined guideway with which said part cooperates, an outer rotatable sleeve mounted on said inner sleeve and means coupling said sleeves frictionally, so that during increase in the speed of rotation of the input element the sleeves collectively lag with respect to the input element and are displaced axially in a forward direction relatively thereto through cooperation of said part and said guideway and during decrease of the speed of rotation of the input element the sleeves firstly collectively over-run the input element so as to be displaced axially in the reverse direction to their initial position, and secondly the outer sleeve alone over-runs so as to dissipate surplus energy in said frictional coupling means the sleeves being connected operatively with the actuating member for the counter to operate same in response to said forward and reverse axial displacements of the sleeves.

References Cited in the file of this patent
UNITED STATES PATENTS

| | | |
|---|---|---|
| 981,920 | Fleischman | Jan. 17, 1911 |
| 1,339,744 | Diskin | May 11, 1920 |
| 1,686,623 | De Malherbe | Oct. 9, 1928 |
| 2,103,077 | Herron | Dec. 21, 1937 |
| 2,337,813 | Grossenbacher | Dec. 28, 1943 |

FOREIGN PATENTS

| | | |
|---|---|---|
| 466,568 | Great Britain | May 28, 1937 |